United States Patent
Lee et al.

(10) Patent No.: US 11,882,527 B2
(45) Date of Patent: *Jan. 23, 2024

(54) DATA-DRIVEN METHODS FOR LOOK UP TABLE-FREE CLOSED-LOOP ANTENNA IMPEDANCE TUNING

(71) Applicant: Samsung Electronics Co., Ltd., Gyeonggi-do (KR)

(72) Inventors: Donghoon Lee, San Diego, CA (US); Pranav Dayal, San Diego, CA (US); Kee-Bong Song, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/903,901

(22) Filed: Sep. 6, 2022

(65) Prior Publication Data

US 2023/0051037 A1 Feb. 16, 2023

Related U.S. Application Data

(63) Continuation of application No. 17/097,548, filed on Nov. 13, 2020, now Pat. No. 11,438,850.

(60) Provisional application No. 63/079,080, filed on Sep. 16, 2020, provisional application No. 63/075,987, filed on Sep. 9, 2020.

(51) Int. Cl.
*H04W 52/24* (2009.01)
*H04B 17/10* (2015.01)
*H04B 1/40* (2015.01)
*H04B 17/19* (2015.01)

(52) U.S. Cl.
CPC ............ *H04W 52/246* (2013.01); *H04B 1/40* (2013.01); *H04B 17/103* (2015.01); *H04B 17/19* (2015.01)

(58) Field of Classification Search
CPC ... H04W 52/246; H04B 17/103; H04B 17/19; H04B 1/40
See application file for complete search history.

(56) References Cited

U.S. PATENT DOCUMENTS

| 6,118,409 A | 9/2000 | Pietsch |
| 9,031,523 B2 | 5/2015 | Anderson |

(Continued)

FOREIGN PATENT DOCUMENTS

| CN | 110147590 | 8/2019 |
| CN | 110365425 | 10/2019 |

OTHER PUBLICATIONS

Q. Gu et al., "A new method for matching network adaptive control," IEEE Trans. Microw. Thoery Techn., vol. 61, No. 1, pp. 587-595, 2013.

(Continued)

*Primary Examiner* — Junpeng Chen
(74) *Attorney, Agent, or Firm* — The Farrell Law Firm, P.C.

(57) ABSTRACT

A method and a closed-loop antenna impedance tuning (CL-AIT) system are provided. An input reflection coefficient is determined. The input reflection coefficient and a threshold value are compared to determine whether the input reflection coefficient is greater than the threshold value. In response to determining that the input reflection coefficient is greater than the threshold value, an optimal tuner code is determined based on a tuner code search algorithm. The optimal tuner code is applied to configure the CL-AIT system.

20 Claims, 10 Drawing Sheets

(56) References Cited

U.S. PATENT DOCUMENTS

| | | |
|---|---|---|
| 9,332,471 B2 | 5/2016 | Huang et al. |
| 9,401,738 B2 | 7/2016 | Wang et al. |
| 10,410,834 B1 | 9/2019 | Ryu |
| 2003/0076168 A1 | 4/2003 | Forrester |
| 2005/0093624 A1 | 5/2005 | Forrester |
| 2007/0093282 A1 | 4/2007 | Chang |
| 2012/0038524 A1 | 2/2012 | Song |
| 2012/0154070 A1 | 6/2012 | Camp, Jr. |
| 2013/0044033 A1* | 2/2013 | Nickel .................. G01R 29/10 343/703 |
| 2013/0052967 A1 | 2/2013 | Black |
| 2014/0091968 A1 | 4/2014 | Harel |
| 2014/0175896 A1 | 6/2014 | Suzuki |
| 2014/0222997 A1 | 8/2014 | Mermoud et al. |
| 2015/0195126 A1 | 7/2015 | Vasseur et al. |
| 2015/0236728 A1 | 8/2015 | Suzuki |
| 2016/0173172 A1* | 6/2016 | Greene ................ H04W 24/10 455/562.1 |
| 2017/0221032 A1 | 8/2017 | Mazed |
| 2017/0346178 A1 | 11/2017 | Shi |
| 2020/0144973 A1 | 5/2020 | Gunzner |
| 2021/0218430 A1 | 7/2021 | Han |

OTHER PUBLICATIONS

Y. Li, et al., "An automatic impedance matching method based on the feedforward-backpropagation neural network for a WPT System," IEEE Trans. Ind. Electron., vol. 66, No. 5, pp. 3963-3972, 2019.

K. Levenberg, "A method for the solution of certain non-linear problems in least squares," Q. Appl. Math., vol. 2, No. 2, pp. 164-168, 1944.

D. P. Kingma et al., "ADAM: A method for stochastic optimization," in Int. Conf. Learning Representations (ICLR), San Diego, CA, 2015, pp. 15.

R. S. Sutton et al., Reinforcement Learning: An Introduction, Cambridge, MA: The MIT Press, 2017, pp. 445.

D. E. Rumelhart et al., Parallel Distributed Processing: Explorations in the Microstructure of Cognition, vol. 1: Foundations, Cambridge, MA, USA: The MIT Press, 1986, pp. 318-362.

* cited by examiner

DATA-DRIVEN METHODS FOR LOOK UP TABLE-FREE CLOSED-LOOP ANTENNA IMPEDANCE TUNING

PRIORITY

This application is a Continuation application of U.S. application Ser. No. 17/097,548, filed in the U.S. Patent and Trademark Office on Nov. 13, 2020, now U.S. Pat. No. 11,438,850, issued on Sep. 6, 2022, which is based on and claims priority under 35 U.S.C. § 119(e) to U.S. Provisional patent application filed on Sep. 9, 2020 and assigned Ser. No. 63/075,987, and to U.S. Provisional patent application filed on Sep. 16, 2020 and assigned Ser. No. 63/079,080, the entire contents of which are incorporated herein by reference.

FIELD

The present disclosure is generally related to closed-loop antenna impedance tuning (CL-AIT).

BACKGROUND

For radio antenna transmission systems, an impedance mismatch causes power reflection from the antenna and subsequently degrades the overall transmission efficiency due to the loss in power transferred to the antenna. Therefore, impedance tuning to minimize the impedance mismatch loss plays an important role in mobile devices with the limited power supply. A task of impedance tuning is tantamount to configuring a matching network (or a tuner) by properly adjusting its components including switches, capacitors, and inductors.

SUMMARY

According to one embodiment, a method in a CL-AIT system is provided. An input reflection coefficient is determined. The input reflection coefficient and a threshold value are compared to determine whether the input reflection coefficient is greater than the threshold value. In response to determining that the input reflection coefficient is greater than the threshold value, an optimal tuner code is determined based on a tuner code search algorithm. The optimal tuner code is applied to configure the CL-AIT system.

According to one embodiment, a CL-AIT system includes a memory and a processor configured to determine an input reflection coefficient. The processor is also configured to compare the input reflection coefficient and a threshold value to determine whether the input reflection coefficient is greater than the threshold value. In response to the determining that the input reflection coefficient is greater than the threshold value, the processor is configured to determine an optimal tuner code based on a tuner code search algorithm, and apply the optimal tuner code to configure the CL-AIT system.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
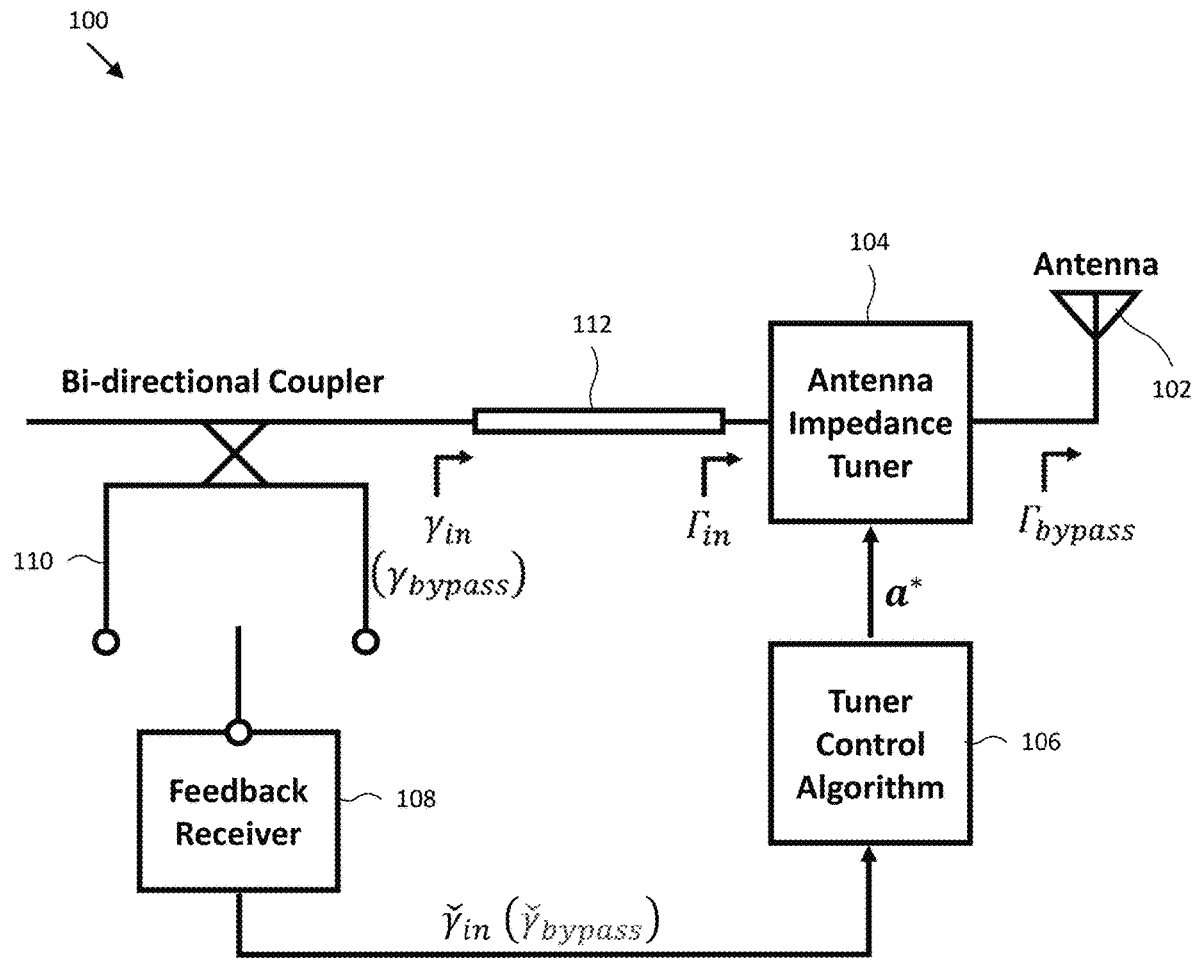
FIG. 1 illustrates a diagram of a CL-AIT system, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

A CL-AIT system with automatically configurable matching networks is allows compensation of body effects such as hand grip causing changes in antenna load, which is critical for the performance of mobile devices with metallic housing, by monitoring changes in antenna impedance and adjusting the tuner configuration accordingly. As opposed to conventional CL-AIT solutions (e.g., based on lookup table (LUT) search), this disclosure provides a data-driven method to configure a tuner for CL-AIT.

Configuring the tuner may be equivalent to finding a tuner code. The optimal tuner code is determined by solving an optimization problem. Two types of cost functions are considered to maximize the instantaneous performance and the asymptotic performance of CL-AIT, respectively. While the former is cost-efficiently tackled by hill-climbing (HC) algorithms, the latter is addressed under the RL framework. In any case, a parametric model is considered for the cost function learned from data. First, disclosed herein is an analytic model to utilize the domain knowledge. Second, disclosed herein is a black box model based on a neural network. Parameters of both models are estimated by solving non-linear least squares problems in offline/online fashion.

FIG. 1 illustrates a diagram of a CL-AIT system, according to an embodiment. The CL-AIT 100 includes an antenna 102, an antenna impedance tuner 104, a tuner control algorithm 106, a feedback receiver 108, a bi-directional coupler 110, and a radio frequency (RF) printed circuit board (PCB) 112 connecting the bi-directional coupler 110 and the antenna impedance tuner 104. The antenna impedance tuner 104 is located between the bi-directional coupler 110 and the antenna 102. The antenna impedance tuner 104 is configured by a tuner code α (typically represented in a binary vector) to set up its switches' state and L/C values. The bi-directional coupler 110 is used to couple transmitted and reflected signals to the feedback path. Then, those captured signals are used to compute the AIT metric, which is an indirect measure of the input reflection coefficient $\Gamma_{in}$ towards the antenna impedance tuner 104, denoted as $\check{\gamma}_{in}$. $\gamma_{bypass}$ denotes $\gamma_{in}$ measured with the default (or bypass) tuner code $\alpha_{bypass}$. According to $\check{\gamma}_{bypass}$, a tuner control algorithm 106 determines the optimal tuner code α* to maximize the power transferred to the antenna 102.

Figure 2:
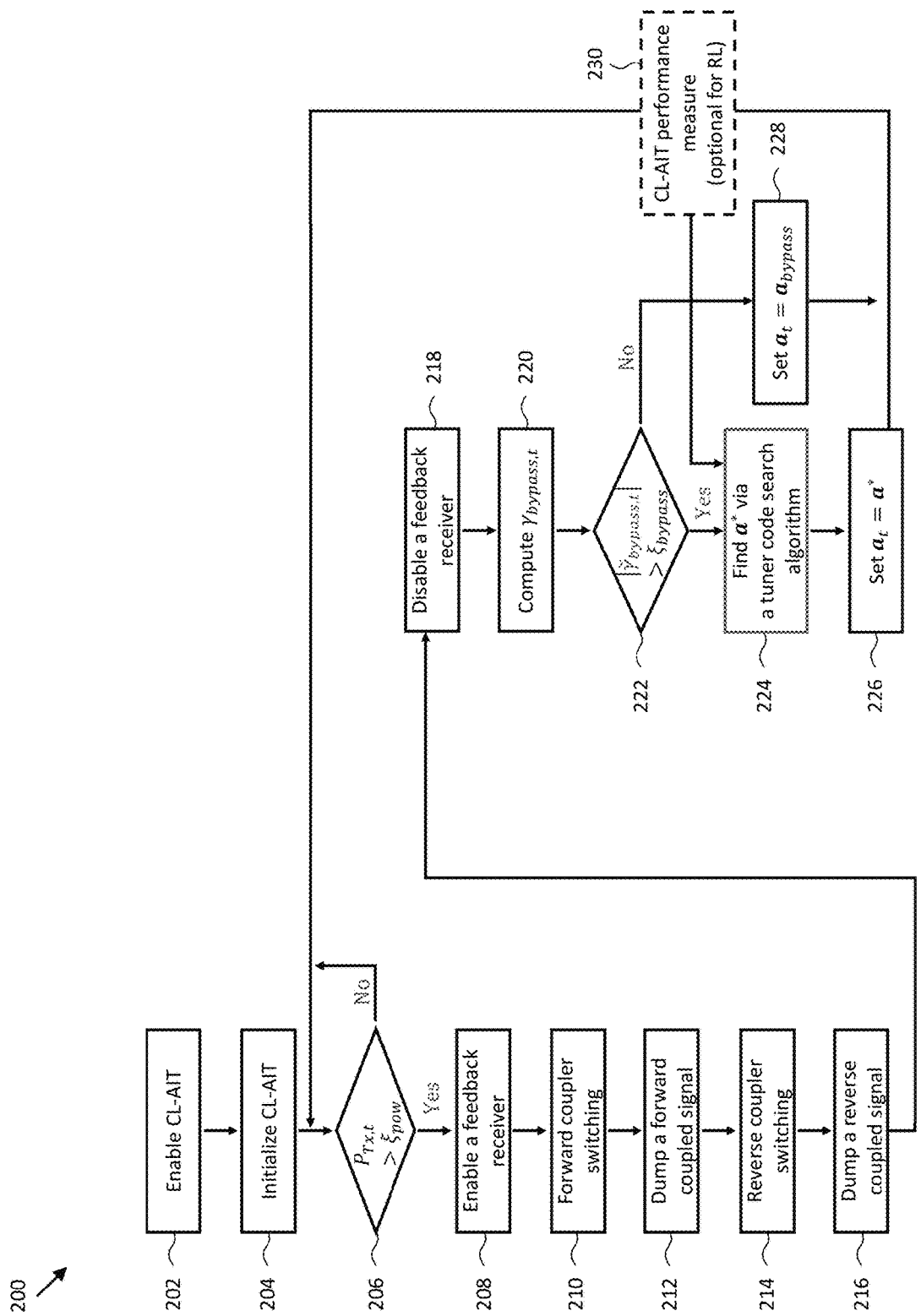
FIG. 2 illustrates a flowchart showing an operation of a CL-AIT system, according to an embodiment.

FIG. 2 illustrates a flowchart showing an operation of a CL-AIT system, according to an embodiment. At 202, the system enables the CL-AIT. At 204, the system initializes the CL-AIT. At 206, at time slot t, the system determines whether the transmitted power $P_{Tx,t}$ is above the pre-determined threshold $\xi_{pow}$ to guarantee the desired signal-to-noise ratio (SNR) of dumped signals and save sufficient power for the antenna to work in arbitrary environment. If the transmitted power $P_{Tx,t}$ is above the pre-determined threshold, then at 208, the system enables a feedback receiver, at 210, the system forwards coupler switching, at 212, the system dumps a forward coupled signal, at 214, the system reverses coupler switching, at 216, the system dumps a reverse coupled signal, and at 218, the system disables a feedback receiver.

At 220, the system determines $\gamma_{bypass,t}$. At 222, the system determines whether $|\check{\gamma}_{bypass,t}| > \xi_{bypass}$, where $\xi_{bypass}$ is a bypass threshold determined by the target AIT performance. If $|\check{\gamma}_{bypass,t}| > \xi_{bypass}$, at 224, the system determines α* from the tuner control algorithm, and at 226, the system sets the tuner code as $\alpha_t = \alpha^*$. If $|\check{\gamma}_{bypass,t}| \leq \xi_{bypass}$, at 228, the system sets the tuner code as $\alpha_t = \alpha_{bypass}$. At 230, the system may perform a CL-AIT performance measure in embodiments utilizing RL, as is described below.

To formulate a problem to find α*, a data-driven cost function needs to be defined by using CL-AIT metric, $\check{\gamma}_{in}$. $\Gamma_{in}$ and $\Gamma_{bypass}$ denote the true reflection coefficients at the tuner input with arbitrary tuner code α and with $\alpha_{bypass}$, respectively. With the known topology of the tuner, a conventional solution may consider a cost based on the analytical expression of $\Gamma_{in}$ with respect to α, $\Gamma_{bypass}$, and a channel frequency ω. Given $\Gamma_{bypass}$ and ω, α* can be found as a solution of Equation (1):

(P1)

$$\min_{\alpha \in \mathcal{A}} |\Gamma_{in}(\alpha, \Gamma_{bypass}, \omega)| \tag{1}$$

where $\mathcal{A}$ is a set of available tuner codes. Equivalently, the voltage standing wave ratio (VSWR) can be adopted as the cost of (P1). However, there is a mismatch between $\gamma_{in}$ (or $\gamma_{bypass}$) and $\Gamma_{in}$ (or $\Gamma_{bypass}$) due to the transmission line effect over the RF PCB 112 and other source of uncertainties in the forward and backward signals at the bi-directional coupler. Furthermore, the fact that only $\check{\gamma}_{in}$ is available in a CL-AIT system justifies the choice of the data-driven cost based on $\check{\gamma}_{in}$, not $\Gamma_{in}$.

Figure 3A:
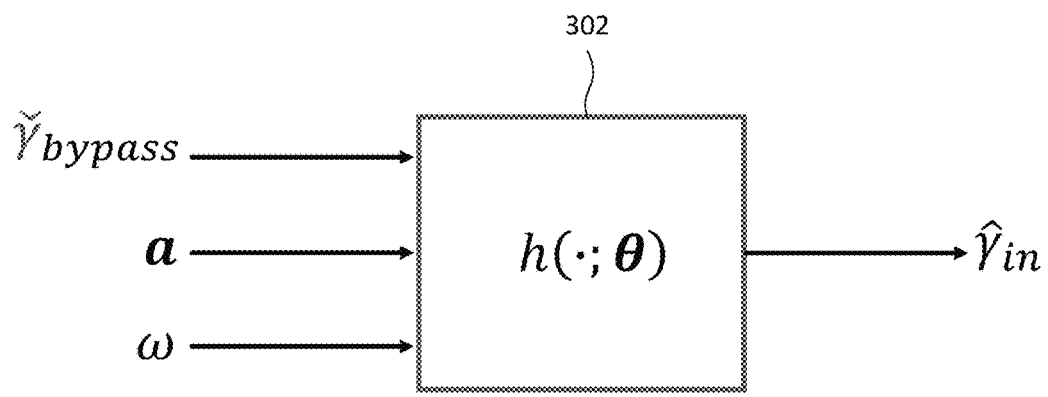
FIGS. 3A and 3B illustrate diagrams of transfer function models, according to an embodiment.
Figure 3B:
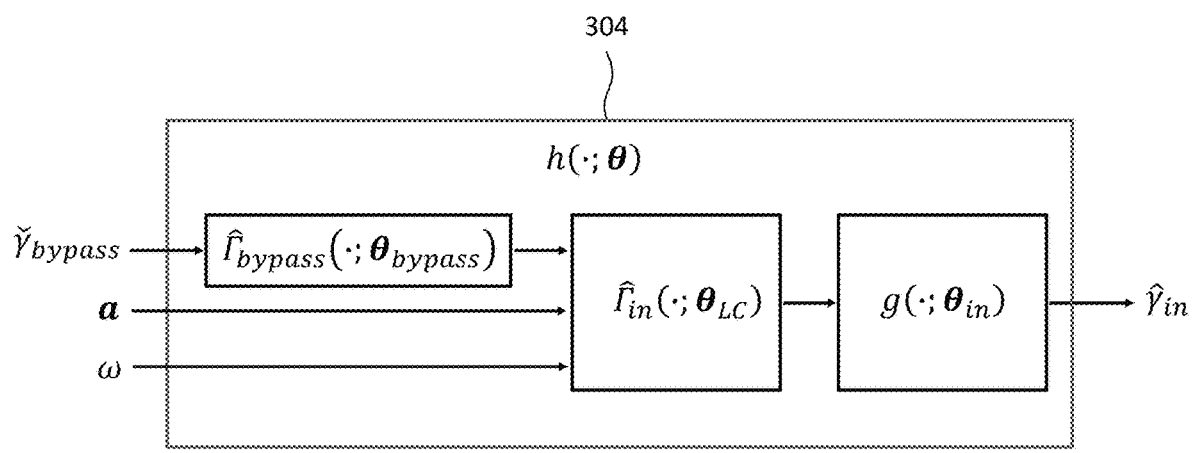

FIGS. 3A and 3B illustrate diagrams of transfer function models for $\gamma_{in}$, according to an embodiment. The transfer function model 302 may be utilized for analytic modeling or blind modeling, while the transfer function model 304 may be utilized for the analytic model described below. To find the data-driven cost considering the instantaneous performance of CL-AIT, learning of a transfer function of $\gamma_{in}$ is utilized. It is modeled as a function of $\alpha$, $\check{\gamma}_{bypass}$, and $\omega$ with unknown generic parameter vector $\theta$. A model of $h(\bullet; \theta)$ is either analytically derived by using the domain knowledge of the tuner (e.g., the tuner topology), or blindly modeled (e.g., by using a neural network). As $\theta$ is independent of $\omega$, the memory size to store $h(\bullet; \theta)$ does not grow with the number of supporting channel frequencies.

For the analytic modeling, $h(\bullet; \theta)$ is modeled to be a composite function of $\hat{\Gamma}_{in}(\bullet; \theta_{LC})$, $\hat{\Gamma}_{bypass}(\bullet; \theta_{bypass})$, and $g(\bullet; \theta_{in})$, where $\theta_{LC}$, $\theta_{bypass}$, and $\theta_{in}$ are model parameters for $\hat{\Gamma}_{in}$, $\hat{\Gamma}_{bypass}$, and $g$, respectively, with $\theta := [\theta_{LC}^T, \theta_{bypass}^T, \theta_{in}^T]^T$, as shown in 304. While $\hat{\Gamma}_{in}(\bullet; \theta_{LC})$ with $\hat{\Gamma}_{bypass}(\bullet; \theta_{bypass})$ models $\Gamma_{in}$ at the tuner input, $g(\bullet; \theta_{in})$ captures the transformation of $\Gamma_{in}$ along the RF PCB section 112, bi-directional coupler 110, and feedback receiver 108. The transformation function $g(\bullet; \theta_{in})$ is empirically modeled to include scaling, rotation, and translation of $\hat{\Gamma}_{in}(\bullet; \theta_{LC})$. Let $\alpha_{in} \in \mathbb{R}$, $\phi_{in} \in \mathbb{R}$, and $b_{in} \in \mathbb{C}$ denote unknown scaling, rotation, and translation parameters, which define $\theta_{in} := [\alpha_{in}, \phi_{in}, b_{in}]^T$. Then, $\gamma_{in}$ is modeled to be, as in Equation (2).

$$\gamma_{in} \approx \hat{\gamma}_{in} = g(\hat{\Gamma}_{in}(a, \hat{\Gamma}_{bypass}(\check{\gamma}_{bypass}; \theta_{bypass}), \omega; \theta_{LC}); \theta_{in}) := \quad (2)$$
$$\alpha_{in} \exp(j\phi_{in}) \hat{\Gamma}_{in}(a, \hat{\Gamma}_{bypass}(\check{\gamma}_{bypass}; \theta_{bypass}), \omega; \theta_{LC}) + b_{in}.$$

On the other hand, given the topology of the tuner, $\hat{\Gamma}_{in}(\alpha, \hat{\Gamma}_{bypass}(\check{\gamma}_{bypass}; \theta_{bypass}); \omega; \theta_{LC})$ is modeled to have the identical form of $\Gamma_{in}(\alpha, \Gamma_{bypass}; \omega)$ in Equation (1). The difference in the analytic model is, the L/C component values in $\Gamma_{in}(\alpha, \Gamma_{bypass}; \omega)$ are assumed to be unknown model parameters in $\theta_{LC}$ and estimated from data, instead of considering their nominal values available in the specification of the tuner. This allows capturing of an actual response of the tuner rather than naively relying on its ideal response, and subsequently to address uncertainties in hardware of. Since the form of $\hat{\Gamma}_{in}(\bullet; \theta_{LC})$ is tuner-model-specific, the example in consideration of a reference tuner model is described with respect to FIG. 6 will be provided. Similar to the modeling of $g(\bullet; \theta_{in})$, furthermore, it is modeled to be $\hat{\Gamma}_{bypass}(\check{\gamma}_{bypass}; \theta_{bypass}) := \alpha_{bypass}^{-1} e^{-j\phi_{bypass}} (\check{\gamma}_{bypass} - b_{bypass})$ with $\theta_{bypass} := [\alpha_{bypass}, \phi_{bypass}, b_{bypass}]^T$.

For the blind modeling, $\theta$ is simply a neural network parameter, which will be determined by a choice of the neural network structure (e.g., feedforward neural network or convolutional neural network).

For either modeling approach, $\theta$ is estimated by solving a non-linear least squares problem. Given a training dataset $\{\check{\gamma}_{in,n}, \alpha_n, \check{\gamma}_{bypass,n}, \omega_n\}_{n=1}^N$, $\theta$ iteratively solves the problem as in Equation (3):

$$\min_{\theta} C(\theta) = \sum_{n=1}^{N} |\check{\gamma}_{in,n} - h(a_n, \check{\gamma}_{bypass,n}, \omega_n; \theta)|^2, \quad (3)$$

which can be tackled via gradient-based algorithms in offline/online fashion. Examples of the gradient-based solvers include (stochastic) gradient descent, Gauss-Newton, Levenberg-Marquardt, and adaptive moment (ADAM) algorithms.

Once the estimate of $\theta$ is obtained, denoted as $\hat{\theta}$, $\alpha^*$ can be found by solving Equation (4):

(P1')

$$\min_{a \in \mathcal{A}} |h(a, \check{\gamma}_{bypass}, \omega; \hat{\theta})|, \quad (4)$$

which is found by replacing $\Gamma_{in}(\alpha, \Gamma_{bypass}, \omega)$ in Equation (1) with $h(\alpha, \check{\gamma}_{bypass}, \omega; \hat{\theta})$ Since $\mathcal{A}$ is finite, $\alpha^*$ can be found in greedy manner via exhaustive search. However, it is computational expensive when $\mathcal{A}$ is large. To cost-effectively determine $\alpha^*$ for given $\check{\gamma}_{bypass}$ and $\omega$, an HC algorithm according to Table 1 is disclosed. A threshold $\xi^*$ can be pre-determined from the target performance measure for the stopping criterion of the algorithm. Recall that the analytic transfer function model of $\Gamma_{in}$, which is $\hat{\Gamma}_{in}(\alpha, \hat{\Gamma}_{bypass}(\check{\gamma}_{bypass}; \hat{\theta}_{bypass}), \omega; \hat{\theta}_{LC})$, is also readily available as a byproduct of the analytic model of $h(\bullet; \theta)$ (not for the neural network model). Inspired by the conventional cost in Equation (1), then, $\hat{\Gamma}_{in}(\bullet; \hat{\Gamma}_{bypass}(\bullet; \hat{\theta}_{bypass}); \bullet; \hat{\theta}_{LC})$ can be used instead of $\hat{\gamma} = h(\bullet; \hat{\theta})$ for (P1') in Equation (4), that is, to find $\alpha^*$ by solving $$\min_{a \in \mathcal{A}} |\hat{\Gamma}_{in}(a, \hat{\Gamma}_{bypass}(\check{\gamma}_{bypass}; \hat{\theta}_{bypass}), \omega; \hat{\theta}_{LC})|.$$

TABLE 1

Input: $\omega$, $\check{\gamma}_{bypass}$, $h(\cdot; \hat{\theta})$, $N_{iter}$, and $\xi^*$
Output: $a^*$
Initialization Step:
Initialize $a^{(0)} \in \mathcal{A}$ at random
Search Step:
    Set i ← 0
for i ≤ $N_{iter}$ and $|h(a^{(i)}, \check{\gamma}_{bypass}, \omega; \hat{\theta})| > \xi^*$ do
    Construct $\mathcal{N}(a^{(i)})$ including every $a \in \mathcal{A}$ with XOR($a^{(i)}$, a) = 1

Find $a_{candidate} = \arg\min_{a \in \mathcal{N}(a^{(i)})} |h(a, \check{\gamma}_{bypass}, \omega; \hat{\theta})|$ if $|h(a_{candidate}, \check{\gamma}_{bypass}, \omega; \hat{\theta})| \leq |h(a^{(i)}, \check{\gamma}_{bypass}, \omega; \hat{\theta})|$
    Update $a^{(i+1)} \leftarrow a_{candidate}$
    else
Break
    end
        Set i ← i + 1
end
Set $a^* \leftarrow a^{(i)}$
Return $a^*$ The algorithm in Table 1 has low computational complexity, but guarantees locally optimal $\alpha^*$ only. To avoid potentially undesirable local minima, the system may also adopt a random-restart HC (RRHC) algorithm. This is a meta-algorithm built on the standard HC algorithm in that it conducts a series of HC searches via the standard algorithm in Table 1 with randomly initialized $\alpha^{(0)}$ at each attempt, until $|h(\alpha^*, \breve{\gamma}_{bypass}, \omega; \hat{\theta})| \leq \xi^*$, or the maximum number of restarts $N_{restart}$ reached.

Alternatively, an RL algorithm may be utilized that considers the overall flow of CL-AIT operation. With the RL approach, a Markov decision process (MDP) is defined first as a tuple $(\mathcal{S}, \mathcal{A}, \mathcal{P}_{ss'}^\alpha, \mathcal{R}_{ss'}^\alpha, \beta, \mathcal{S}_0)$, where $\mathcal{S}$ is a set of states, $\mathcal{A}$ is a set of actions, $\mathcal{P}_{ss'}^\alpha$ is a transition probability to the next state s' when action $\alpha$ is taken at state s, $\mathcal{R}_{ss'}^\alpha$ is the stochastic reward function to map the sequence (s, $\alpha$, s') to r∈ ℝ, β∈(0,1] is the discount factor to balance current and future rewards, and $\mathcal{S}_0$ is the distribution over initial states $s_0$. In particular, $\mathcal{P}_{ss'}^\alpha$ and $\mathcal{R}_{ss'}^\alpha$ constitute the model of the MDP. As opposed to conventional machine learning, RL is interaction-based learning.

Figure 4:
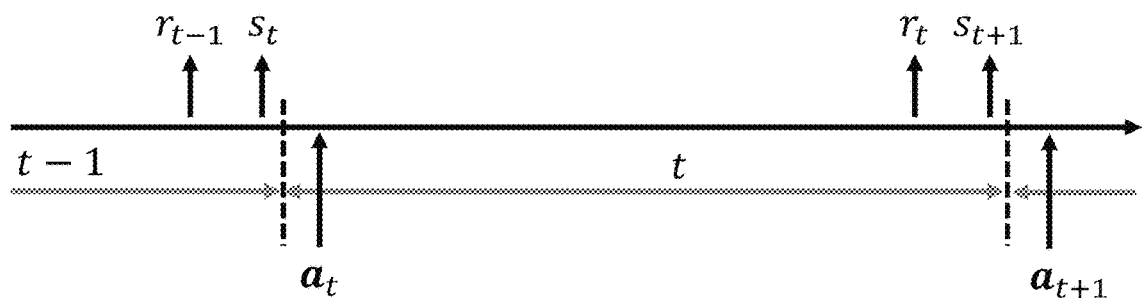
FIG. 4 illustrates evolution of features in reinforcement learning (RL) over time, according to an embodiment.

FIG. 4 illustrates evolution of features in RL over time, according to an embodiment. At each time slot t, an agent takes action $\alpha_t$ at given state $s_t$ according to a current policy $\pi: \mathcal{S} \to \mathcal{A}$. Then, the agent receives a reward $r_t$ and the next state $s_{t+1}$, and updates the current policy accordingly. Upon finding the correspondence of key features between CL-AIT and RL as summarized in Table 2, the system checks that the operation of RL is precisely matched with that of CL-AIT in FIG. 2. The block for the CL-AIT performance measure at 230 in FIG. 2 is utilized under the RL framework.

TABLE 2

Correspondence of features between RL and CL-AIT

| Reinforcement learning | CL-AIT |
| --- | --- |
| Agent | Antenna impedance tuner |
| State s | Reflection coefficient in bypass $\breve{\gamma}_{bypass}$ and channel frequency ω |
| Action α | Tuner code α |
| Reward r | Performance measure: e.g., VSWR$^{-1}$, $-|\breve{\gamma}_{in}|$, total radiated power |
| Policy π | A strategy to find α* |

Figure 5:
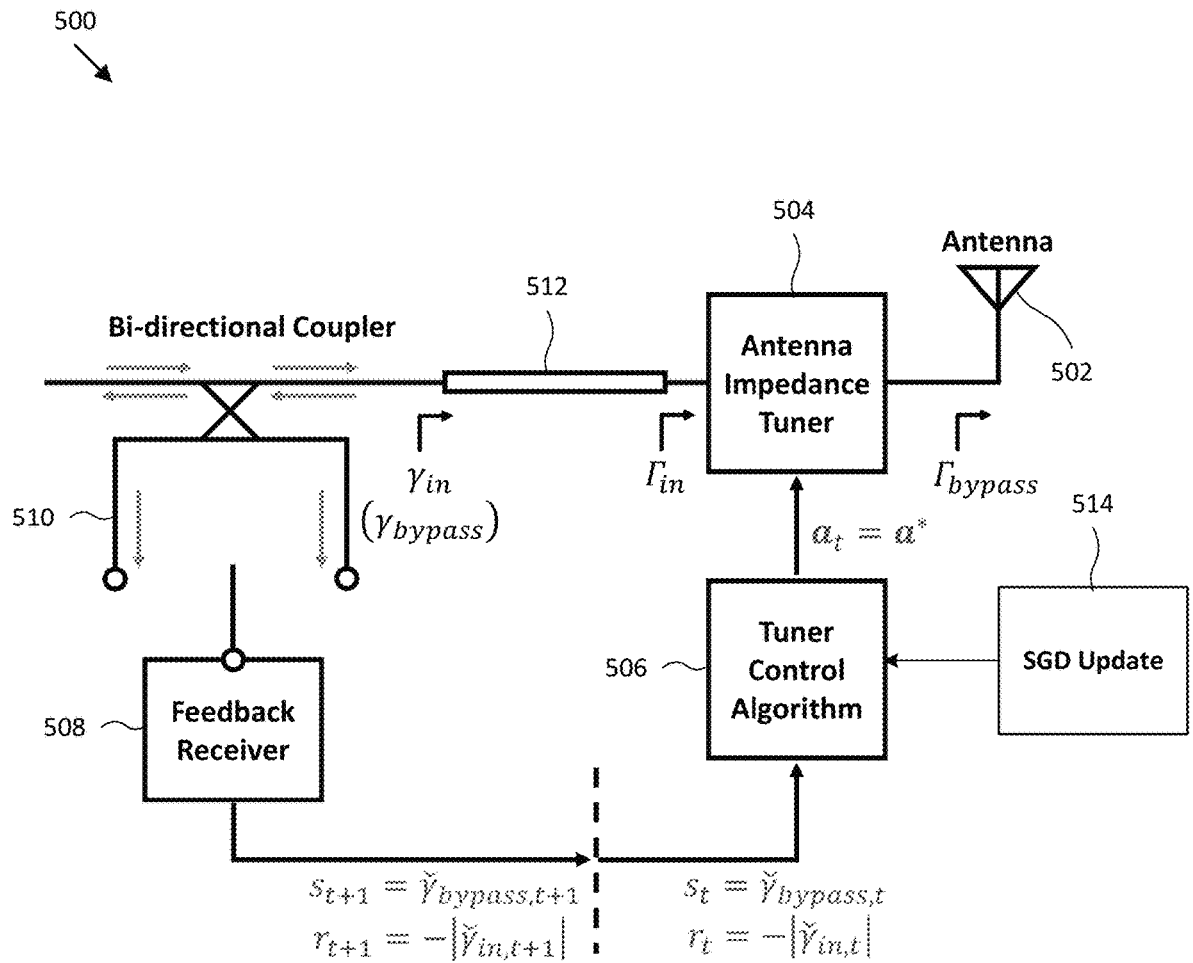
FIG. 5 illustrates a diagram of a CL-AIT system, according to an embodiment.

FIG. 5 illustrates a diagram of a CL-AIT system, according to an embodiment. The CL-AIT 500 includes an antenna 502, an antenna impedance tuner 504, a tuner control algorithm 506, a feedback receiver 508, a bi-directional coupler 510, and an RF PCB 512. By assuming the reward as $r_t = -|\breve{\gamma}_{in,t}|$, a diagram for CL-AIT under RL is shown in FIG. 5. A stochastic gradient descent (SGD) update 514 may be applied to the tuner control algorithm 506, as further described below.

A goal of RL is to learn the optimal policy π* by solving Equation (5):

(P2)
$$\max_\pi V^\pi(s), \forall s \in \mathcal{S} \quad (5)$$

where $V^\pi(s)$ is so-termed state value function defined as in Equation (6).

$$V^\pi(s) := \mathbb{E}\left[\sum_{t=0}^\infty \beta^t \mathcal{R}_{s_t s_{t+1}}^{\pi(s_t)} | s_0 = s\right] \quad (6)$$

$V^\pi(s)$ captures the asymptotic performance of CL-AIT in the long run by considering the expected sum of discounted rewards. (P2) is essentially equivalent to (P1) when β=0. π* satisfies the Bellman optimality, as in Equation (7):

$$V^*(s) := V^{\pi^*}(s) = \max_{a \in \mathcal{A}} \underbrace{\sum_{s'} p_{ss'}^a \left[\mathcal{R}_{ss'}^q + \beta V^*(s')\right]}_{=: Q^*(s, a)} \forall s \in \mathcal{S} \quad (7)$$

where is Q*(s, α) is the optimal state-action value function. Due to the recursion in V*(s), π* can be found via dynamic programming (DP), if the MDP is known. π can be represented as a LUT of size $|\mathcal{S}| \times |\mathcal{A}|$ during learning, where the operator 11 stands for the cardinality of a set. However, the MDP model is not known for CL-AIT due to unknown $\mathcal{P}_{ss'}^\alpha$ and $\mathcal{R}_{ss'}^\alpha$. Furthermore, the memory requirement to store π during the learning process is demanding since $\mathcal{S}$ is continuous and $\mathcal{A}$ is large. With the aim of scalability, the RL problem is handled via approximate dynamic programming (ADP) to reduce the computational complexity and memory requirement of a solver by dropping dependency with $|\mathcal{S}|$.

The theory of MDPs states that the action at state s from the greedy policy π can be retrieved via Equation (8):

$$\pi(s) = \arg\max_{a \in \mathcal{A}} Q^\pi(s, a), \forall s \in \mathcal{S} \quad (8)$$

with the state-action value function $Q^\pi(s, \alpha) := \mathbb{E}[\mathcal{R}_{ss_1}\alpha + \sum_{t=1}^\infty \beta^t \mathcal{R}_{s_t s_{t+1}}^{\pi(s_t)} | s_0=s, \alpha_0=\alpha]$. Therefore, if Q*(s, α) becomes available, α* can be found via Equation (8) without using the explicitly stored π*. However, the expectation involved in $Q^\pi(s, \alpha)$ cannot be evaluated due to unknown $\mathcal{P}_{ss'}^\alpha$ and $\mathcal{R}_{ss'}^\alpha$ for CL-AIT. To bypass this issue, the system learns an approximate model of Q*(s, α) in sequential manner by using data collected offline or during CL-AIT operation. $\hat{Q}(s, \alpha; \theta)$ denotes an approximate function of $Q^\pi(s, \alpha)$, which can be modeled via neural networks with parameter vector θ. $\varepsilon_t$ denotes the episode defined as a finite sequence $\langle s_0, \alpha_0, r_0, s_1, \alpha_1, r_1, s_2, \ldots, s_t, \alpha_t, r_t \rangle$ with $s_0 \sim \xi_0$ collected up to time slot t. Then, θ can be estimated by solving Equation (9):

(P3)
$$\min_\theta C(\theta) := \frac{1}{t} \sum_{(s_\tau, a_\tau) \in \varepsilon_t} \left(Q^+(s_\tau, a_\tau; \theta^{(t-1)}) - \hat{Q}(s_\tau, a_\tau; \theta)\right)^2. \quad (5)$$

where $$Q^+(s_t, a_t; \theta) := r_t + \beta \max_{a' \in \mathcal{A}} \hat{Q}(s_{t+1}, a'; \theta)$$

is a target cost-to-go to approximate unavailable true $Q^\pi(s_t, \alpha_t)$. As $\varepsilon_t$ grows over t, the SGD is adopted to efficiently solve (P3) by minimizing the instantaneous squared error at each time slot t, as in Equation (10):

$$\min_\theta C_t(\theta) := \left(Q^+(s_t, a_t; \theta^{(t-1)}) - \hat{Q}(s_t, a_t; \theta)\right)^2 \quad (10)$$

where $\theta^{(t)}$ is the estimate of θ at time slot t. The minimization problem in Equation (10) is processed at each time slot t to sequentially estimate θ with the reduced computational complexity, rather than solving (P3) in Equation (9) in batch fashion. The update rule for θ at time slot t can be found as in Equation (11):

$$\theta^{(t)} \leftarrow \theta^{(t-1)} - \eta \nabla_\theta C_t(\theta)|_{\theta=\theta^{(t-1)}} \quad (11)$$

with a learning rate $\eta > 0$. The gradient $\nabla_\theta C_t(\theta)$ can be obtained by using well-known backpropagation.

$N_\varepsilon$ denotes the number of episodes. Further, the ε-greedy algorithm with $\hat{Q}(s, \alpha; \theta)$ is defined, as in Equation (12):

$$\pi^\varepsilon(s; \theta) := \begin{cases} \arg\max_{a \in \mathcal{A}} \hat{Q}(s, a; \theta), & w.p. \ 1-\varepsilon \\ UniformRandom(\mathcal{A}), & w.p. \ \varepsilon \end{cases} \quad (12)$$

in order to balance exploration and exploitation during learning process. The RL itself actively chooses α at s from π to collect data and then polish the current π. This interaction is unique in RL compared to other learning methods, where data is passively given to the learner. This leads to the Q-learning algorithm summarized in Table 3.

TABLE 3

Q-learning algorithm for AIT

Input: MDP\{$\mathcal{P}_{ss'}^a$, $\mathcal{R}_{ss'}^a$}, β, ε, $N_\varepsilon$ and η
Output: π*
Initialization Step:
Initialize $\theta^{(0)}$ at random
Learning Step:
  for i = 1, . . . , $N_\varepsilon$ do
    Initialize $s_0 \in \mathcal{S}$
    Find action $a_0 = \pi^\varepsilon(s_0; \theta^{(0)})$ in Equation (12)
    for t = 1, . . . , T do
      Take action $a_t$, receive $r_t$, and observe the next state $s_{t+1}$ TABLE 3-continued Q-learning algorithm for AIT $Q^+(s_t, a_t; \theta^{(t-1)}) \leftarrow r_t + \beta \max_{a' \in \mathcal{A}} \hat{Q}(s_{t+1}, a'; \theta^{(t-1)})$ Set $C_t(\theta) = (Q^+(s_t, a_t; \theta^{(t-1)}) - \hat{Q}(s_t, a_t; \theta))^2$
Compute $\nabla_\theta C_t(\theta)$ by using backpropagation
$\theta^{(t)} \leftarrow \theta^{(t-1)} - \eta \nabla_\theta C_t(\theta)|_{\theta=\theta^{(t-1)}}$
Find action $a_{t+1} = \pi^\varepsilon(s_{t+1}; \theta^{(t)})$ in Equation (12)
$t \leftarrow t + 1$
    end for
  Set $\theta^{(0)} \leftarrow \theta^{(T)}$
end for Set $\hat{\theta} \leftarrow \theta^{(T)}$
$\pi^* \leftarrow \pi$ greedy w.r.t. $\hat{Q}(s, a; \hat{\theta})$
Return $\pi^*$ Other algorithms may be adopted to get a better descent direction rather than $\nabla_\theta C_t(\theta)$, since the SGD might suffer from slow convergence. Examples of those algorithms include Levenberg-Marquardt (LM) and adaptive moment (ADAM) algorithms. Furthermore, the Q-learning algorithm in Table 3 can be extended to the online setup by setting $N_\varepsilon=1$ and $T \to \infty$, which does not require offline training. Lastly, the HC algorithms described herein also can be adopted to cost-efficiently perform $$\arg\max_{a \in \mathcal{A}} \hat{Q}(s, a; \theta).$$

Figure 6:
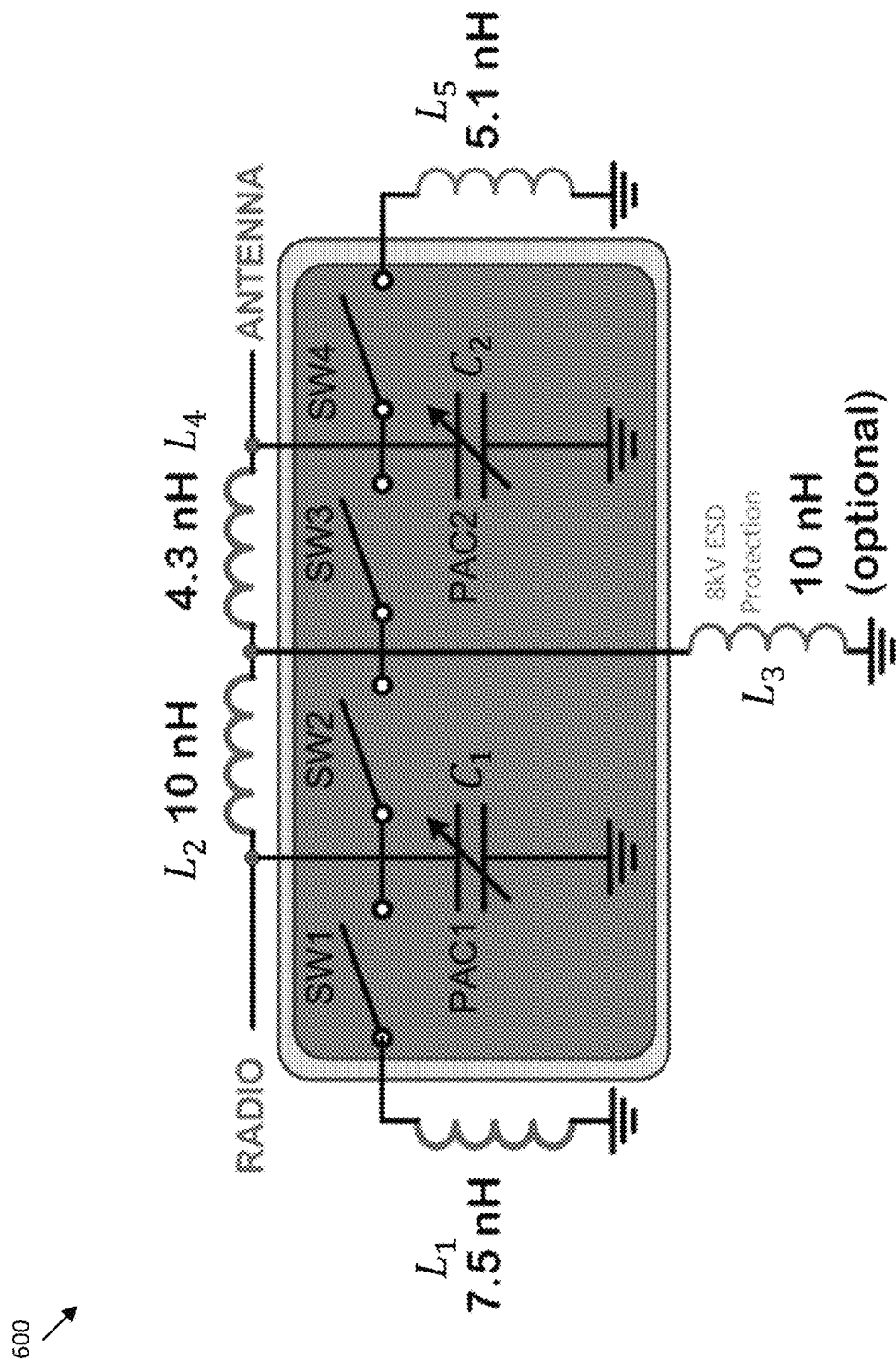
FIG. 6 illustrates a diagram of a reference tuner model, according to an embodiment.

FIG. 6 illustrates a diagram of a reference tuner model 600, according to an embodiment. Synthetic tests were performed to validate the disclosed algorithms. With the characteristic impedance $Z_0=50$ (Ω), ω=900 (MHz), and $\alpha \in \{0,1\}^{12}$, RF 1135 in FIG. 6 was considered as a reference tuner model 600 with $L_1=7.5$ (nH), $L_2=10$ (nH), $L_3=7.5$ (nH), $L_4=4.3$ (nH), $L_5=5.1$ (nH), $C_1(\alpha)=(2^3 \times \alpha_5+2^2 \times \alpha_6+2^1 \times \alpha_7+2^0 \times \alpha_8+1)C_{min,1}$, and $C_2(\alpha)=(2^3 \times \alpha_9+2^2 \times \alpha_{10}+2^1 \times \alpha_{11}+2^0 \times \alpha_{12}+1)C_{min,2}$ with $C_{min,1}=C_{min,2}=0.47$ (pF).

Given the tuner model, the transfer function of $\Gamma_{in}$ with respect to α, ω, and $\Gamma_{bypass}$ was analytically derived as a generative model as in Equation (13).

$$\Gamma_{in}(a, \Gamma_{bypass}, \omega) = \frac{Y_{in}^{-1}(a, \Gamma_{bypass}) - Z_0}{Y_{in}^{-1}(a, \Gamma_{bypass}) + Z_0}, \quad (13)$$

where $$Y_{in}(a, \Gamma_{bypass}) = \frac{1}{j\omega L_1'(a)} + \frac{1}{j\omega(L_2'(a)+L_3)} \quad (14)$$

$$\left\{1 - \frac{L_3^2(Z_{ant}(\Gamma_{bypass})+j\omega L_5'(a))}{L_2'(a)+L_3} \times [Z_{ant}(\Gamma_{bypass})L_4'(a)+j\omega L_4'(a)L_5'(a)+Z_{ant}(\Gamma_{bypass})L_5'(a)+L_3(Z_{ant}(\Gamma_{bypass})+j\omega L_5'(a))]^{-1}\right\}$$

with $L_1'(a) := (a_1/L_1 - \omega^2 C_1(a))^{-1}$, $L_2'(a) := (1-a_2)L_2$, $L_4'(a) := (1-a_3)L_4$, and $L_5'(a) := (a_4/L_5 - \omega^2 C_2(a))^{-1}$, and $$Z_{ant}(\Gamma_{bypass}) = \frac{1+\Gamma_{bypass}}{1-\Gamma_{bypass}} Z_0. \quad (15)$$

Then, $\gamma_{in}$ was modeled as a scaled and rotated version of $\Gamma_{in}$, and so does $\gamma_{bypass}$, that is, $\gamma_{in} = \tilde{\alpha}\exp(j\tilde{\phi})\Gamma_{in}(\alpha, \Gamma_{bypass}, \omega)$ with $\tilde{\alpha}=0.9$ and $\tilde{\phi}=50$, and $\gamma_{bypass}=\tilde{\alpha}\exp(j\tilde{\phi})\Gamma_{bypass}$ with $\tilde{\alpha}=0.6$ and $\tilde{\phi}=30$. After randomly generating $\Gamma_{bypass}$, $\gamma_{in}$ and $\check{\gamma}_{bypass}$ were found by adding noise to $\gamma_{in}$ and $\gamma_{bypass}$, respectively. The performance metric was set to Equation (16) with $\tilde{\Gamma}_{bypass}(\check{\gamma}_{bypass}) := \tilde{\alpha}^{-1}\exp(-j\tilde{\phi})\check{\gamma}_{bypass}$ $$VSWR(a, \check{\gamma}_{bypass}, \omega) := \frac{1+|\Gamma_{in}(a, \tilde{\Gamma}_{bypass}(\check{\gamma}_{bypass}), \omega)|}{1-|\Gamma_{in}(a, \tilde{\Gamma}_{bypass}(\check{\gamma}_{bypass}), \omega)|}. \quad (16)$$

For the algorithms described herein, $h(\alpha, \check{\gamma}_{bypass}, \omega; \theta)$ via analytic modeling particularly considered $$\hat{\Gamma}_{in}(a, \hat{\Gamma}_{bypass}(\check{\gamma}_{bypass}; \theta_{bypass}), \omega; \theta_{LC}) = \tag{17}$$

$$\frac{\hat{Y}_{in}^{-1}(a, \hat{\Gamma}_{bypass}(\check{\gamma}_{bypass}; \theta_{bypass}), \omega; \theta_{LC}) - Z_0}{\hat{Y}_{in}^{-1}(a, \hat{\Gamma}_{bypass}(\check{\gamma}_{bypass}; \theta_{bypass}), \omega; \theta_{LC}) + Z_0},$$

where $$\hat{Y}_{in}(a, \hat{\Gamma}_{bypass}(\check{\gamma}_{bypass}; \theta_{bypass}), \omega; \theta_{LC}) = \frac{1}{j\omega L'_1(a)} + \tag{18}$$

$$\frac{1}{j\omega(L'_2(a) + L_3)}\left\{1 - \frac{L_3^2(Z_{ant}(\hat{\Gamma}_{bypass}(\check{\gamma}_{bypass}; \theta_{bypass})) + j\omega L'_5(a))}{L'_2(a) + L_3} \times \right.$$

$$[Z_{ant}(\hat{\Gamma}_{bypass}(\check{\gamma}_{bypass}; \theta_{bypass}))]L'_4(a) +$$

$$j\omega L'_4(a)L'_5(a) + Z_{ant}(\hat{\Gamma}_{bypass}(\check{\gamma}_{bypass}; \theta_{bypass}))L'_5(a) +$$

$$\left.L_3(Z_{ant}(\hat{\Gamma}_{bypass}(\check{\gamma}_{bypass}; \theta_{bypass})) + j\omega L'_5(a))]^{-1}\right\}$$

with $\theta_{LC}:=[L_1, L_2, L_3, L_4, L_5, C_{min,1}, C_{min,2}]^T$ and $Z_{ant}(\cdot)$ in Equation (15). The model of $\hat{\Gamma}_{in}(\alpha, \hat{\Gamma}_{bypass}(\check{\gamma}_{bypass}; \theta_{bypass}), \omega; \theta_{LC})$ in Equation (18) has the identical form of $\Gamma_{in}(\alpha, \Gamma_{bypass}, \omega)$ in Equation (13), but the L/C component values in $\theta_{LC}$ are estimated rather than considering their nominal values.

$h(\alpha, \check{\gamma}_{bypass}, \omega; \theta)$ via blind modeling and $\hat{Q}(s, \alpha; \theta)$ were modeled by using feedforward neural networks with 3 and 2 hidden layers, respectively, having 30 nodes per layer with rectified linear unit (ReLU) activation functions, while the output layer considered the pure linear activation functions.

After estimating θ via the LM for the analytic model and the ADAM for the neural network (blind) model, respectively, in an offline manner, the CL-AIT algorithms were tested over a set of randomly generated measurements of $\check{\gamma}_{bypass}$. For HC algorithms, it was set to $N_{iter}=20$ and $N_{restart}=34$. For the Q-learning algorithm, a deterministic reward function is set as $\mathcal{R}_{ss'}{}^\alpha:=\text{VSWR}^{-1}(\alpha, \check{\gamma}\text{bypass}, \omega)$, and subsequently, $r_t=\text{VSWR}^{-1}(\alpha_t, \check{\gamma}_{bypass,t}, \omega)$. Furthermore, $\beta=10^{-3}$ was set to mainly focus on the instantaneous reward. For ε-greedy policy, the epsilon-first strategy was particularly considered, that is, as in Equation (19).

$$\pi^\varepsilon(s; \theta) := \begin{cases} \text{UniformRandom}(\mathcal{A}), & \text{for } t \leq \varepsilon T \\ \underset{a}{\text{argmax}}\, \hat{Q}(s, a; \theta), & \text{for } t > \varepsilon T \end{cases} \tag{19}$$

With such a policy, only the exploration phase occurs for first εT time slots, and only the exploitation phase follows for remaining (1−ε)T time slots. For simulated tests, it was set to ε=0.4 to sufficiently explore large $\mathcal{A}$. Then, α* was found from $$\underset{a}{\text{argmax}}\hat{Q}(s, a; \theta)$$

via exhaustive search (ES). ES was performed to find $$\underset{a}{\min} VSWR(a, \check{\gamma}_{bypass}, \omega)$$

and a LUT with 24 reference load points were considered as competing alternatives. ES is not practical, but shows the performance limit.

Figure 7A:
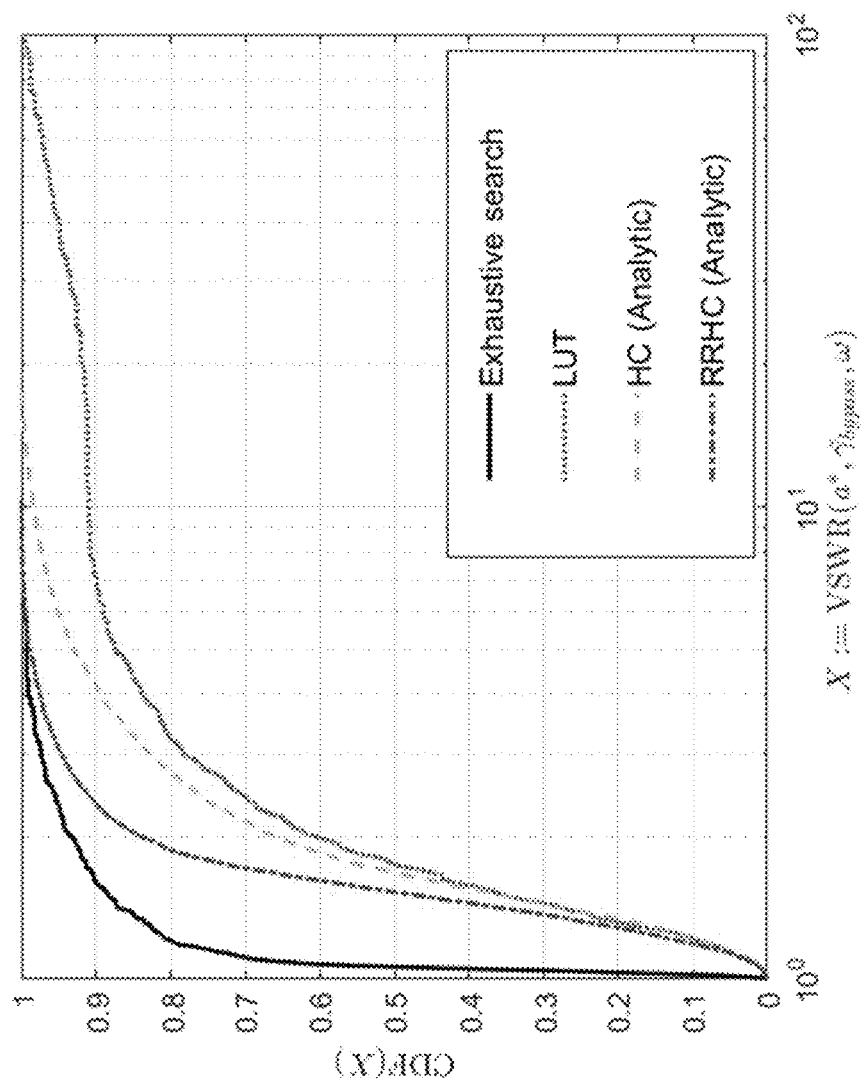
FIGS. 7A, 7B and 7C illustrate graphs showing performance, according to an embodiment.
Figure 7B:
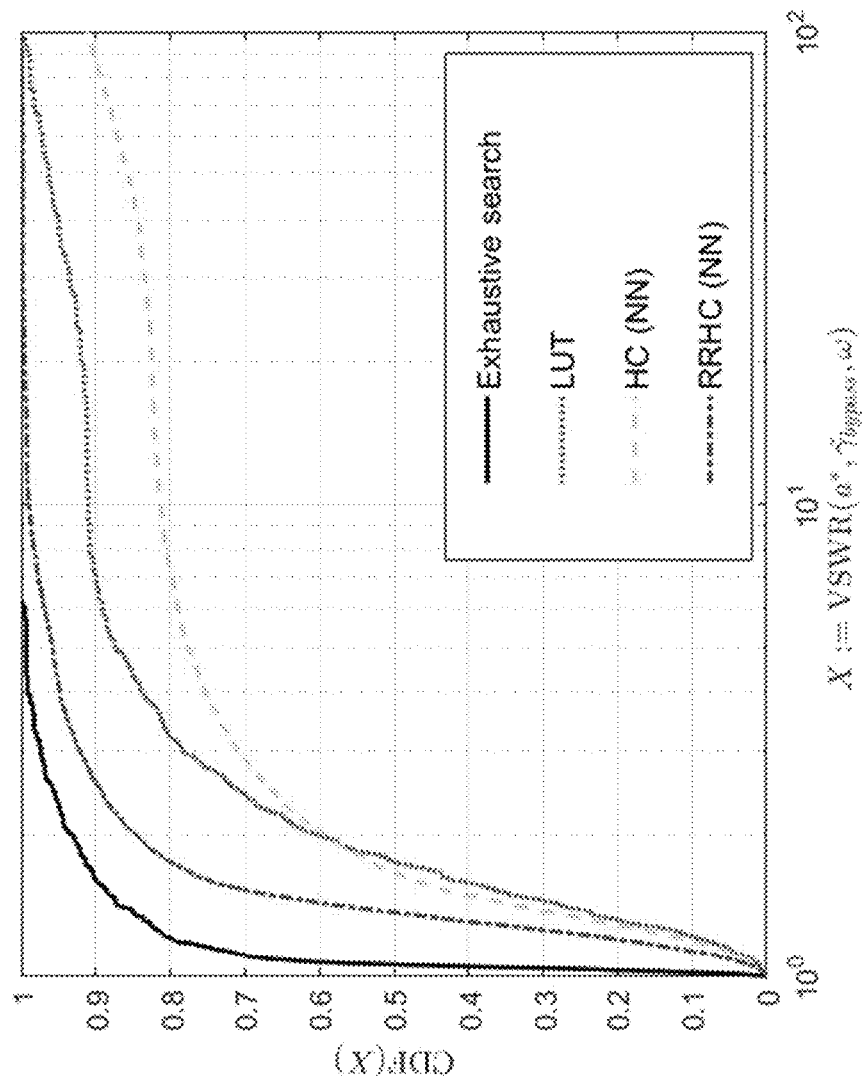
Figure 7C:
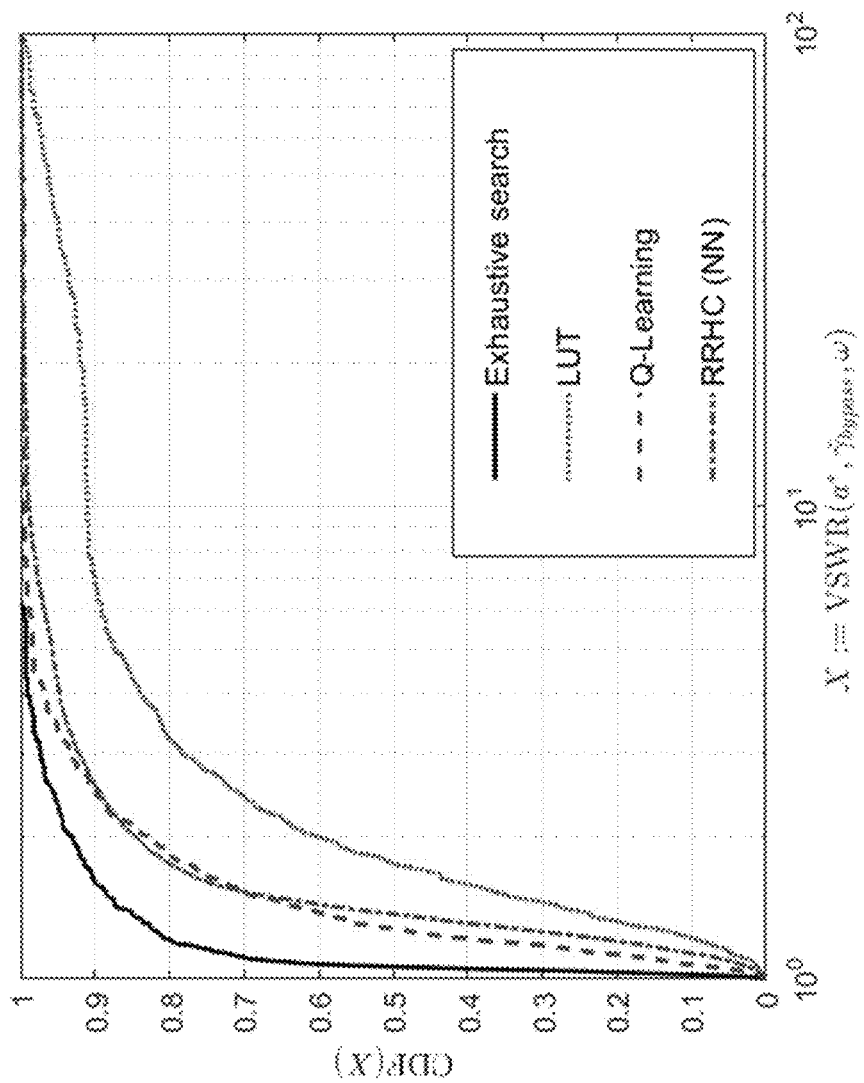

FIGS. 7A, 7B, and 7C illustrate graphs 700, 702 and 706 showing performance, according to an embodiment. FIGS. 7A-7C show the empirical cumulative distribution functions (CDFs) of VSWR after impedance tuning, achieved by the methods and competing alternatives. Both standard HC and RRHC with the analytic model outperformed LUT. In particular, RRHC showed the performance comparable to ES. For the blind model with the neural network, while the standard HC algorithm performed worse than LUT, the RRHC outperformed LUT and was comparable to ES similar to the case of the analytic model. This infers the existence of undesirable local minima, and the random-restart strategy helps the standard HC algorithm to avoid those points. As explained above, the RL problem (P2) in Equation (3) is approximately equivalent to (P1) in Equation (1) by setting β≈0. Therefore, the Q-learning algorithm performed similar to the RRHC, while RL relied only on the data without using any domain knowledge. The performance of the RL approach comes with higher computational complexity than HC algorithms. As $|\mathcal{A}|=2^{12}$ for the reference tuner 600 in FIG. 6, the complexity is mainly due to finding greedy actions α' to obtain $Q^+$ and $\alpha_{t+1}$, which complexity is in the order of $\mathcal{O}(|\mathcal{A}|)$, at each time slot t. For this preliminary test, the per-time slot elapsed time was $5\times10^{-3}$ (sec) on average with $N_e=30$ and $T=5\times10^3$ for Q-learning in Table 3. One may adopt the HC algorithms to find α' and $\alpha_{t+1}$ with reduced complexity. A more fundamental solution to jointly handle large state space $\mathcal{S}$ and action space $\mathcal{A}$ may be utilized.

The systems and methods disclosed herein outperformed the LUT search for CL-AIT, while addressing practical issues of CL-AIT such as $\check{\gamma}_{bypass}\neq\Gamma_{bypass}$ (or $\check{\gamma}_{in}\neq\Gamma_{in}$) and the imperfectness of hardware with the help of data-driven learning techniques.

The systems and methods use the cost function learned from data, not derived based on ideal response of the tuner, to find the optimal tuner code. The methods are LUT-free methods. As such, the memory requirement does not linearly grow with the number of channel frequencies to support, while a LUT-based solution does. Instead, the memory requirement depends on the size of the model parameter for the cost function, which is independent of the number of channel frequencies. Due to the availability of online algorithms, offline calibration is not necessarily required, and the model can adapt to newly collected data during CL-AIT operation. Conventionally, a cost function is found based on ideal response of the given configuration of the tuner. In practice, however, there is a mismatch between actual and ideal responses of the tuner due to uncertainties in hardware. This eventually degrades the efficacy of such cost. On the other hand, the data-driven cost functions take these uncertainties into account by fitting the cost function model to data collected from a device to operate CL-AIT. As the CL-AIT operates based on the sequential decision making, the reinforcement learning framework fits well on a CL-AIT task.

Figure 8:
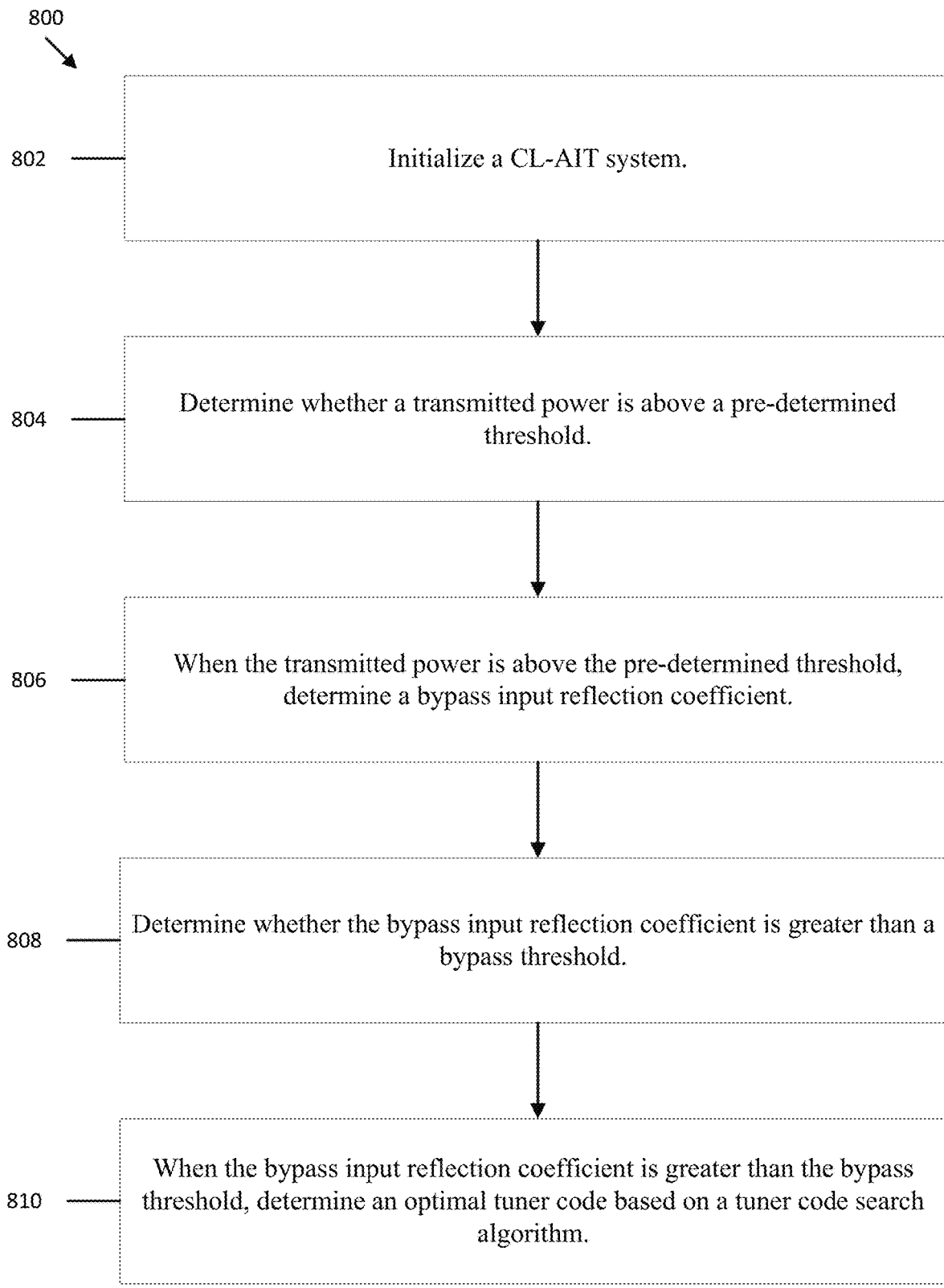
FIG. 8 illustrates a flowchart for a method of determining an optimal tuner code, according to an embodiment.

FIG. 8 illustrates a flowchart 800 for a method of determining an optimal tuner code, according to an embodiment. At 802, the system initializes a CL-AIT system. At 804, the system determines whether a transmitted power is above a pre-determined threshold. At 806, when the transmitted power is above the pre-determined threshold, the system determines a bypass input reflection coefficient. At 808, the system determines whether the bypass input reflection coefficient is greater than a bypass threshold. At 810, when the bypass input reflection coefficient is greater than the bypass threshold, the system determines an optimal tuner code based on a tuner code search algorithm. The tuner code search algorithm may be an HC algorithm or an RL algorithm.

Figure 9:
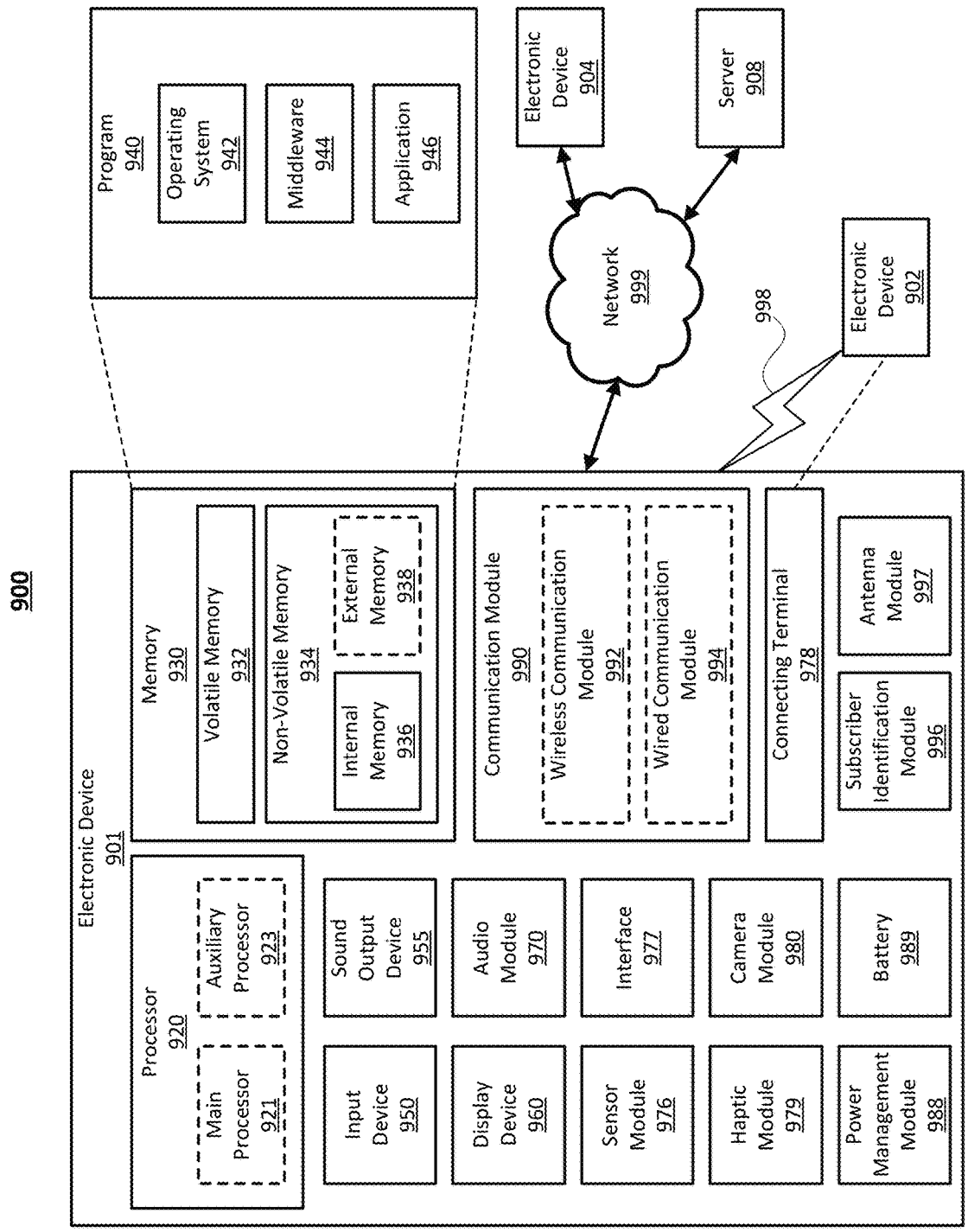
FIG. 9 illustrates a block diagram of an electronic device in a network environment, according to an embodiment.

FIG. 9 illustrates a block diagram of an electronic device 901 in a network environment 900, according to one embodiment. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In one embodiment, at least one (e.g., the display device 960 or the camera module 980) of the components may be omitted from the electronic device 901, or one or more other components may be added to the electronic device 901. In one embodiment, some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute, for example, software (e.g., a program 940) to control at least one other component (e.g., a hardware or a software component) of the electronic device 901 coupled with the processor 920, and may perform various data processing or computations. As at least part of the data processing or computations, the processor 920 may load a command or data received from another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to one embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to one embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to one embodiment, the audio module 970 may obtain the sound via the input device 950, or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. According to one embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. According to one embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement)

or an electrical stimulus which may be recognized by a user via tactile sensation or kinesthetic sensation. According to one embodiment, the haptic module 979 may include, for example, a motor, a piezoelectric element, or an electrical stimulator.

The camera module 980 may capture a still image or moving images. According to one embodiment, the camera module 980 may include one or more lenses, image sensors, image signal processors, or flashes.

The power management module 988 may manage power supplied to the electronic device 901. The power management module 988 may be implemented as at least part of, for example, a power management integrated circuit (PMIC).

The battery 989 may supply power to at least one component of the electronic device 901. According to one embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. According to one embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to one embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

One embodiment may be implemented as software (e.g., the program 940) including one or more instructions that are stored in a storage medium (e.g., internal memory 936 or external memory 938) that is readable by a machine (e.g., the electronic device 901). For example, a processor of the electronic device 901 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method in a closed-loop antenna impedance tuning (CL-AIT) system, comprising:
   determining an input reflection coefficient;
   determining whether the input reflection coefficient is greater than a threshold value;
   in response to determining that the input reflection coefficient is greater than the threshold value, determining an optimal tuner code based on a tuner code search algorithm; and
   applying the optimal tuner code to configure the CL-AIT system.

2. The method of claim 1, wherein the tuner search code algorithm comprises a hill-climbing (HC) algorithm.

3. The method of claim 1, further comprising determining a transfer function model.

4. The method of claim 3, wherein the transfer function model is determined analytically based on tuner topology.

5. The method of claim 3, wherein the transfer function model is determined blindly based on at least one neural network.

6. The method of claim 1, wherein the tuner search code algorithm comprises a reinforcement learning (RL) algorithm.

7. The method of claim 6, further comprising performing a CL-AIT performance measurement.

8. The method of claim 6, the RL algorithm comprises learning an optimal policy to determine the optimal tuner code.

9. The method of claim 8, wherein the RL algorithm comprises determining an optimal state-action value function.

10. The method of claim 6, wherein the RL algorithm utilizes approximate dynamic programming (ADP).

11. A closed-loop antenna impedance tuning (CL-AIT) system, comprising:
    a memory; and
    a processor configured to:
    determine an input reflection coefficient;
    determine whether the input reflection coefficient is greater than a threshold value;
    in response to determining that the input reflection coefficient is greater than the threshold value, determine an optimal tuner code based on a tuner code search algorithm; and
    apply the optimal tuner code to configure the CL-AIT system.

12. The system of claim 11, wherein the tuner search code algorithm comprises a hill-climbing (HC) algorithm.

13. The system of claim 11, wherein the processor is further configured to determine a transfer function model.

14. The system of claim 13, the transfer function model is determined analytically based on tuner topology.

15. The system of claim 13, wherein the transfer function model is determined blindly based on at least one neural network.

16. The system of claim 11, wherein the tuner search code algorithm comprises a reinforcement learning (RL) algorithm.

17. The system of claim 16, wherein the processor is further configured to perform a CL-AIT performance measurement.

18. The system of claim 16, the RL algorithm comprises learning an optimal policy to determine the optimal tuner code.

19. The system of claim 18, wherein the RL algorithm comprises determining an optimal state-action value function.

20. The system of claim 16, wherein the RL algorithm utilizes approximate dynamic programming (ADP).

* * * * *